(12) United States Patent
Shiu et al.

(10) Patent No.: US 8,553,090 B2
(45) Date of Patent: Oct. 8, 2013

(54) PORTABLE IMAGE CAPTURE AND CAMERA DEVICE

(75) Inventors: George Shiu, Fountain Valley, CA (US); Wei Koh, Irvine, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 1682 days.

(21) Appl. No.: 11/517,779

(22) Filed: Sep. 8, 2006

(65) Prior Publication Data

US 2008/0062263 A1    Mar. 13, 2008

(51) Int. Cl.
*H04N 5/225* (2006.01)
*H04N 9/04* (2006.01)
*H04N 5/222* (2006.01)

(52) U.S. Cl.
USPC ............ 348/207.99; 348/333.01; 348/333.06; 348/373

(58) Field of Classification Search
USPC .................. 348/207.99, 333.01, 333.06, 373
See application file for complete search history.

(56) References Cited

U.S. PATENT DOCUMENTS

| | | | |
|---|---|---|---|
| 6,091,377 A | 7/2000 | Kawai | |
| 6,097,507 A | 8/2000 | Bohn | |
| 6,339,447 B1 * | 1/2002 | Kurahashi et al. | 348/96 |
| 6,483,542 B1 * | 11/2002 | Morinaga | 348/333.06 |
| 6,765,674 B2 * | 7/2004 | Orelli et al. | 356/402 |
| 6,785,025 B1 * | 8/2004 | Dawe et al. | 358/474 |
| 6,906,699 B1 * | 6/2005 | Fåhraeus et al. | 345/157 |
| 7,170,557 B2 * | 1/2007 | Manico et al. | 348/333.07 |
| 7,340,342 B2 * | 3/2008 | Skarine | 701/400 |
| 2003/0218681 A1 * | 11/2003 | Manico et al. | 348/333.06 |
| 2004/0028295 A1 | 2/2004 | Allen et al. | |
| 2004/0169767 A1 * | 9/2004 | Norita et al. | 348/350 |
| 2005/0157209 A1 | 7/2005 | Cha et al. | |
| 2005/0205671 A1 | 9/2005 | Gelsomini et al. | |
| 2006/0154704 A1 | 7/2006 | Lee et al. | |
| 2006/0187334 A1 | 8/2006 | Shibata et al. | |
| 2007/0035655 A1 * | 2/2007 | Chen et al. | 348/373 |
| 2008/0291321 A1 * | 11/2008 | Maruyama et al. | 348/373 |

OTHER PUBLICATIONS

International Search Report for International Application No. PCT/US 07/18616, Completed Mar. 12, 2008.

* cited by examiner

*Primary Examiner* — Chikaodili E Anyikire
(74) *Attorney, Agent, or Firm* — Sawyer Law Group, P.C.

(57) ABSTRACT

A portable image capture and camera device is provided including a device body, and an upper panel displaceably engaged to the body, and having an image capture module disposed thereon. A lower panel is also displaceably engaged to the body, for receiving and supporting a subject when the lower panel is deployed to an open position. The upper panel is translatable to deploy from a stowed position to a first deployed position to image a subject disposed on the lower panel (card reader mode), and to a second deployed position to image objects remote from the device (camera mode).

11 Claims, 4 Drawing Sheets

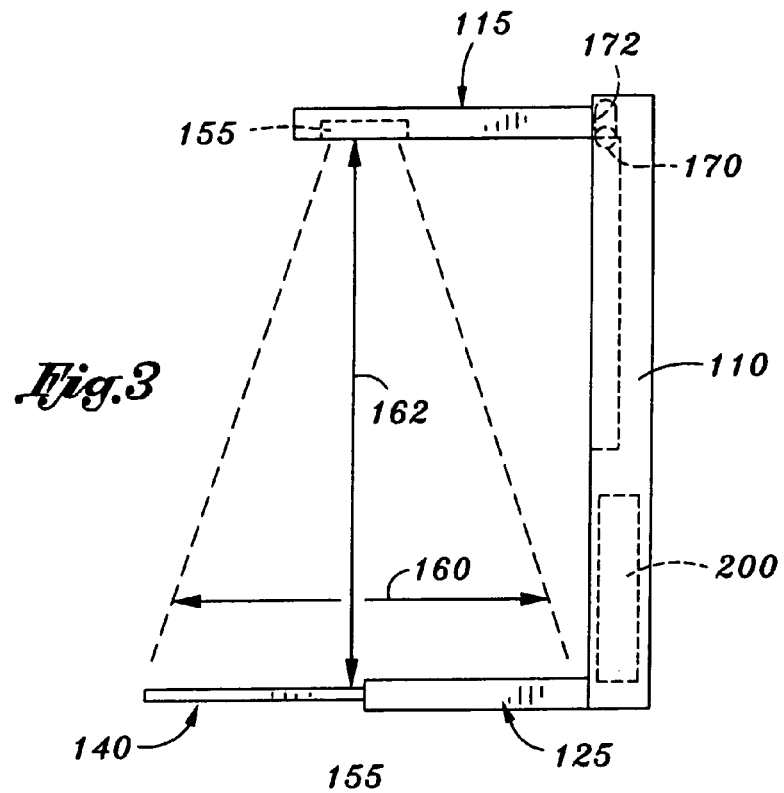
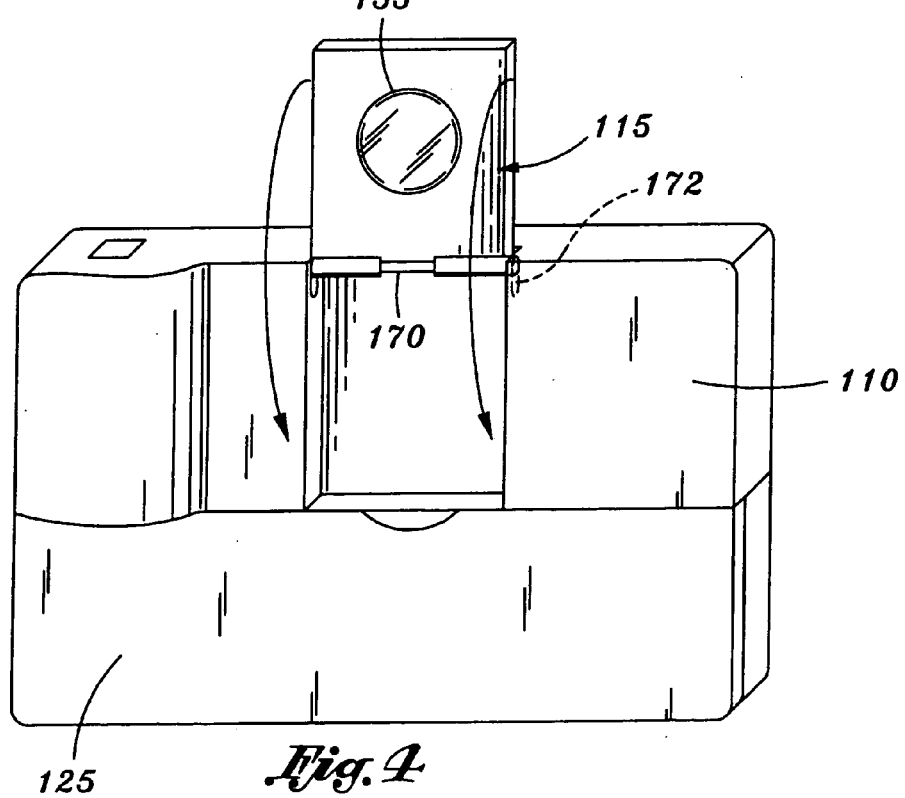

PORTABLE IMAGE CAPTURE AND CAMERA DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

An image capture device, such as a scanner, analyzes and converts an image or an object into a digital image. For example, a basic image scanner analyzes, processes and converts a photograph, printed text or handwriting into a digital image. Desktop image scanners, which have existed for many years, are the most common type of an image capture device.

More recently, smaller, portable versions of desktop scanners have been marketed and sold primarily for the purpose of scanning business and other name cards. Examples of such prior art business and name card scanners include the business and name card reader sold by CardScan, Inc. of Cambridge, Mass. Another example of a currently existing model of a business and name card reader is the BizCard Reader 900c, sold by Card Reader, Inc., doing business as Electronic Document Technology of Sunnyvale, Calif.

Some scanners, including desktop image scanners, utilize a glass flatbed design and scanner head to capture a scanned image. The scanner head is comprised of an imaging element, several mirrors and filters and a lens. The scanner head works in association with the other components of a scanner such as a glass plate, a lamp, a stepper motor, a stabilizer bar, a belt, and a power supply. A desktop image scanner usually requires a scan subject or object to be placed face down on the glass plate. The belt, which is attached to a stepper motor, moves the scanner head across the document causing the imaging element and light source to also move across the glass plate reading the entire area. The assembly is attached to a stabilizer bar to ensure there is no deviation in the complete scan of the scan subject. The subject is visible to the imaging element because of the light reflected by the subject.

Some scanners, such as the aforementioned prior art devices and other similar portable image scanning devices, are equipped with an automatic document feed feature. The user places the scan subject into an insertion slot from which the subject is automatically fed into the scanner. The imaging element remains still during automatic document feed scanning, while the subject is moved through the scanner by rollers at a constant rate. The subject can be collected from a separate exit slot after the object is scanned.

Many prior art devices, such as the aforementioned business and name card readers, typically utilize certain on-board image and text capture software technology or other software applications, to read and scan all of the information on a business or name card and convert the same into a digital image. One such application is optical character recognition (OCR) which can be utilized to scan words and other images from a scan subject and convert the same into a computer-based text. OCR generally utilizes an averaging process to determine what the shape of a character is and match it to the correct letter or number. Thus, when a business or name card is scanned both typed and handwritten information on the card is automatically read into a database. A scanned image of the card can also be saved to a computer-readable file for further alteration and image enhancement.

The imaging element is one of the key components of image capture devices, including desktop or portable image scanners, and the quality of the resulting image is dependent on the imaging element of the device. A charge-coupled device chip, CCD, is the most common imaging technology. CCD technology incorporates a collection of light-sensitive diodes, called photosites, which convert light photons into an electrical charge. Each photosite is sensitive to light so that when bright light hits a single photosite, an electrical charge accumulates at that site. The scanned image reaches the CCD through the array of mirrors, filters and lenses. The exact configuration of these components depends on the model of the scanner. Generally, the image of the document is reflected by an angled mirror to another mirror, with each subsequent mirror having a slight curve to focus the reflected image onto the surface of another mirror. The last mirror reflects the image onto a lens which focuses the image onto the imaging element. The number of mirrors of a CCD device in association with the moving scanner head, belt and motor makes a CCD bulky which can limit the overall size of the device.

A second type of imaging element incorporated into contemporary image capture devices is contact image sensor technology, or CIS. CIS technology is often incorporated into flatbed scanners as an alternative to CCD technology. CIS technology utilizes an array of light emitting diodes under the glass plate. CIS replaces the CCD array of mirrors, filters and lenses with rows of red, green and blue light emitting diodes, or LEDs. The imaging element typically consists of three hundred to six hundred sensors spanning the width of the scan area and is placed very close to the glass plate upon which the document rests. When the image is scanned, the LEDs combine to provide white light to illuminate the image, which is then captured by the row of sensors. Scanning devices that incorporate CIS technology are typically smaller in size, but these devices do not provide the equivalent resolution or overall image quality as do scanning devices that incorporate CCD technology.

Regardless of the type of technology utilized in the image capture device, the glass flatbed design of currently existing portable scanners still requires an insertion slot construction in the device. Thus, even if the more compact CIS technology is incorporated into the image capture device, the overall thickness of the device is typically still substantial.

Other contemporary scanning devices, such as the World-Card duet sold by PennPower Technology Ltd. of Taiwan, incorporate a webcam to scan and read images of business cards. Such devices use image and text recognition software to recognize the information printed on the card. However, the WorldCard duet device lacks portability and versatility because it is must be set up as a webcam to capture an image of a business card. As such, the user can only use the WorldCard duet in connection with a personal computer or other similar device.

Preferably a portable image capture device is compact and preferably pocket-sized. The image capture device may be similar in size to a standard-sized credit card or business card but should have a slightly thicker width. The image capture device should preferably be able to capture data, such as text or other images, typically printed on business or name cards and other similar objects, for further storage and use. The device may also include appropriate software to translate the captured text and images into readable files for further organization and classification. Preferably the device may also function as a digital camera to capture other image subjects in addition to business or name cards. The device may also have the capability to communicate with an external device by any of the available methods of data transmission that facilitate the transfer of information between devices.

BRIEF SUMMARY

A portable image capture and camera device is provided including a device body, and an upper panel displaceably engaged to the body, having an image capture module disposed thereon. A lower panel is also displaceably engaged to the body, for receiving and supporting a subject when the lower panel is deployed to an open position. The upper panel is translatable to deploy from a stowed position to a first deployed position to image a subject disposed on the lower panel (card reader mode), and to a second deployed position to image objects remote from the device (camera mode).

The device includes an image capture module located on one surface of the upper panel. The panel can be rotated ninety degrees to use the image capture module as a business or name card reader. The panel can further be rotated, e.g., an additional ninety degrees, to use the image capture module as a digital camera. The device captures an image with an imaging element and creates a digital image of the information. The disclosed device has a built-in text and character recognition software, in addition to a memory component, so the captured information can be translated into readable computer files, if necessary, and stored for later transfer. Any of the images captured using the disclosed device can be communicated to an external device using most available methods of data transmission.

A portable image capture device, as disclosed, may therefore be used as a business or name card reader and/or as a digital camera. The device eliminates the glass plate that is common in most portable card readers and, therefore, may be compact and slim. The device utilizes digital camera technology to capture images of data and other images typically printed on business or name cards. Thus, the device may be utilized as a digital camera when it is not being used as a card reader.

In another embodiment the upper panel may be slidably engaged to the body, and translatable to a position to image objects remote from the device, and further rotatable to image subjects disposed on the lower panel.

In the presently preferred embodiment the first deployed position is a position rotated 90 degrees relative to the stowed position, and the second deployed position is a position rotated approximately 180 degrees from the stowed position.

The image capture module may be formed on a first surface of the upper panel, such that the image capture module is in substantial abutting relation with the body, when the upper panel is disposed in the stowed position.

A position sensor may be provided to generate an output signal representative of the orientation or position of the upper panel, relative to the body.

Processing circuitry is provided for receiving information from the image capture module and generating an output display thereof. The processing circuitry may include a display device and a microprocessor, the microprocessor being in electrical communication with display device, the image capture module and the position sensor. The microprocessor may be operative to modify processing of information received from the image capture module, in response to signals from the position sensor. As such, the microprocessor may regulate processing, e.g., regulate running of optical character recognition software in relation to the sensed position of the upper panel, indicating that the device is in a card reader mode. The processing circuitry may also regulate image processing, in response to information from the position sensor, indicating whether the device is operating in a card reader mode, or a camera mode. Field of view and focal length may therefore be regulated in response to the sensed position of the upper panel (sensed modes), or the sensed position of such other element as may support the image capture module.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a side view of the embodiment of the image capture device shown at FIG. 2.

FIG. 4 is a front perspective view of an embodiment of the image capture device, shown in a fully rotated position, to be utilized as a camera.

DETAILED DESCRIPTION

Figure 1:
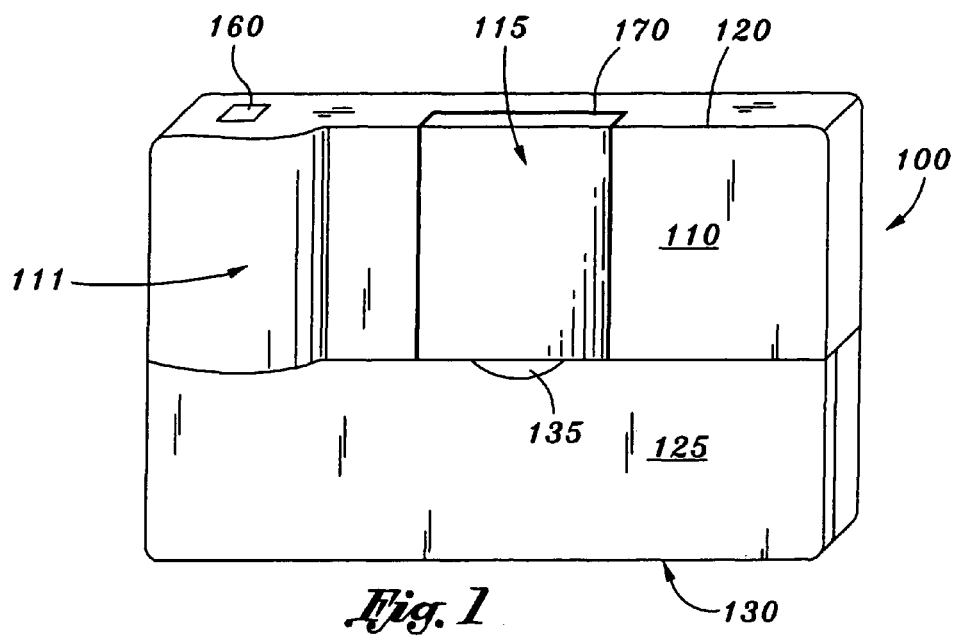
FIG. 1 is a front perspective view of an embodiment of the image capture device, according to the present invention, shown in a closed or stowed position.

Referring now to the drawings, and more particularly to FIG. 1, there is shown a representation of a front view of an image capture device 100 in a closed position. Device 100 is shown substantially as rectangular in shape. However, device 100 may alternately be formed to have other shapes as well.

Figure 6:
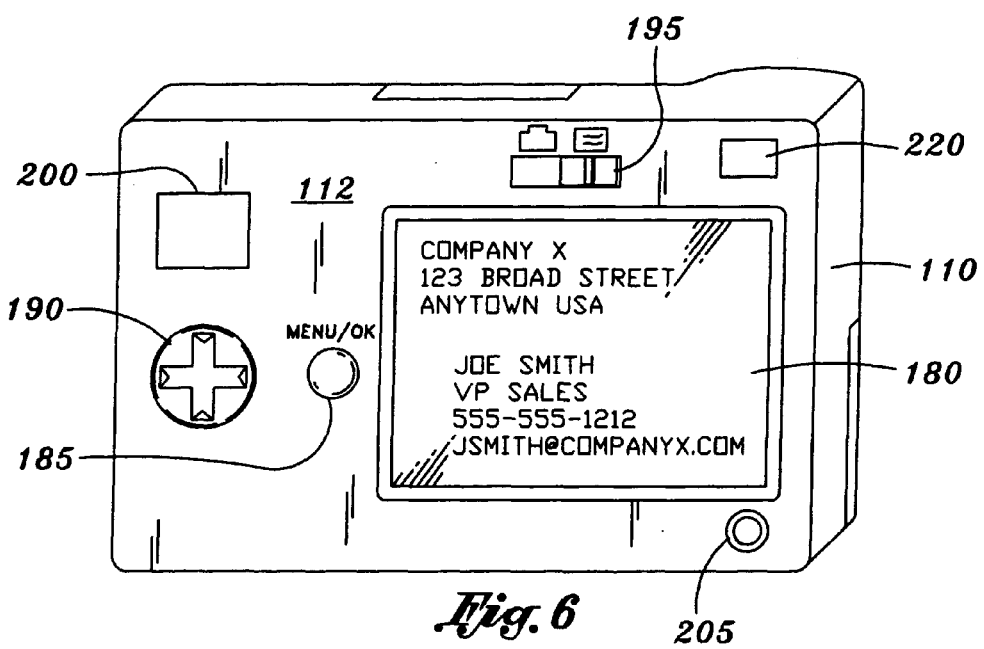
FIG. 6 is a back perspective view of an image capture device according to the present invention.

Device 100 includes a body 110 having a front surface 111, which is relatively flat, and a back surface, shown at FIG. 6. Pivoting, upper panel 115 is located toward a top edge 120 of front surface 111. Pivoting lower panel 125 is located toward a bottom edge 130 of front surface. Upper panel 115 is supported on front surface 111 of body 110 by a hinge 170 located at or near top edge 120 such that upper panel 115 can freely pivot approximately one hundred and eighty degrees away from body 110 and return to its original position. Upper panel 115 is typically opened by rotating upper panel 115 away from body 110 in an upward manner, and closed by rotating upper panel 115 in a downward manner until it is flat against body 110. Body 110 may include a slot to receive upper panel 115 so that upper panel 115 is flush with front surface 111 when in a retracted position.

Figure 5:
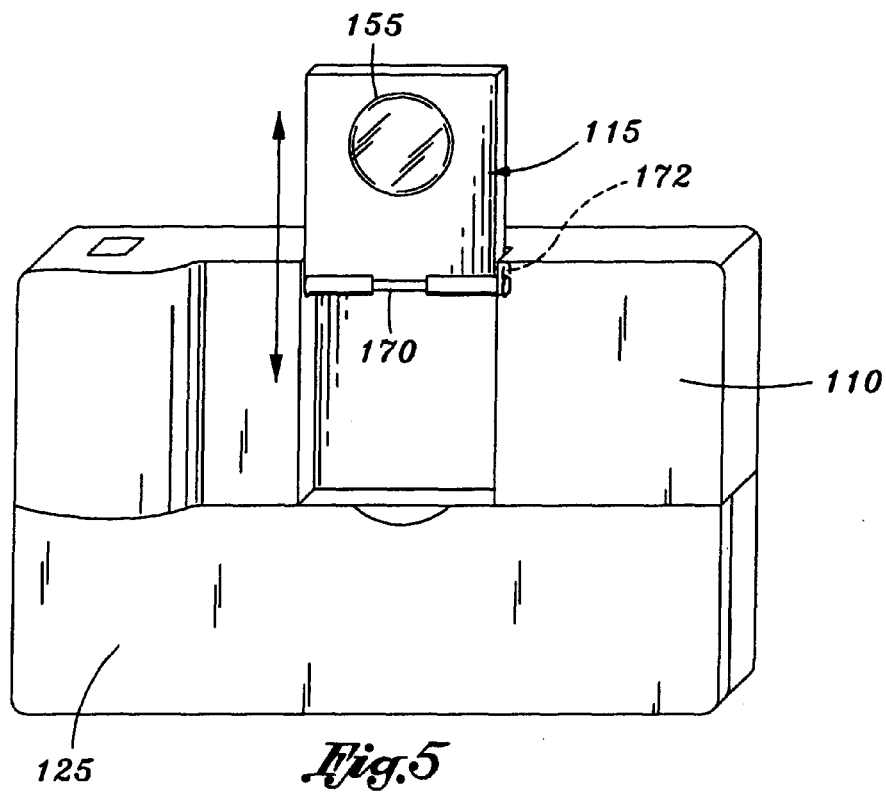
FIG. 5 is a front perspective view of another embodiment of the image capture device shown in a fully translated position, to be utilized as a digital camera.

In one alternate embodiment, upper panel 115 is translatable along the plane of front surface 111 by pushing directly upward, allowing the device to function as a digital camera, as described in further detail with respect to FIG. 5. Upper panel 115 can be slideably mounted in the slot using conventional mounting hardware so that pressure can be applied by the user to extend upper panel 115 directly upward until it is substantially displaced from body 110.

Lower panel 125 is supported on front surface 111 by a hinge (not shown) located at or near bottom edge 130 such that lower panel 125 can be pivoted approximately ninety degrees away from body 110 and returned to its original position. Lower panel 125 is, therefore, rotatable away from body 110, to an orientation substantially perpendicular to the plane of front surface 111.

Release button 135 may be located on lower panel 125 and is operative to deploy lower panel 125, allowing it to pivot and horizontally extend from body 110. Alternatively, if release button 130 is omitted from lower panel 125, lower panel 125 may be pivoted and extended manually. Device 100 further includes an execution button 160 that is depressed to execute the process of recording and saving an image of a subject to the either the built-in memory located inside body 110 or other removable memory storage module, as further described herein with respect to FIG. 7. Execution button 160 is preferably located on top surface body 110, but it may be located anywhere on body 110 that does not interfere with operation of device 100.

Figure 2:
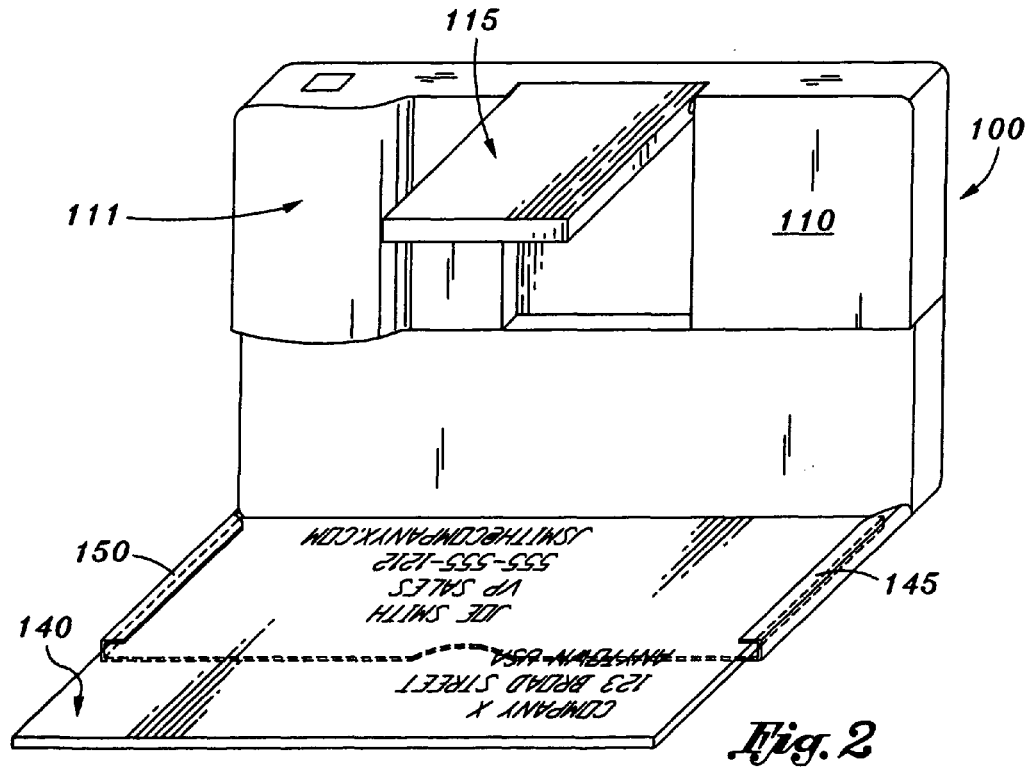
FIG. 2 is a front perspective view of an embodiment of the image capture device shown in a partially rotated position, to be utilized as a card reader.

FIG. 2 is a front perspective view of device 100 in an open position (card reader mode). Upper panel 115 and lower panel (not shown) are pivoted approximately ninety degrees from front surface 111 of body 110. Lower panel (not shown) is shown as bounded by a first side edge 145 and a second side edge 150. First and second side edges 145, 150 may each be slightly raised in relation to lower panel (not shown) to form a recessed groove. The recessed groove of first and second side edges, 145, 150 guide and facilitate the insertion and positioning of an image subject 140, such as a business card, onto lower panel (not shown). Image subject 140 can alternately be materials or objects which the user selects to capture an image.

FIG. 3 is a side view of a device 100, as shown at FIG. 2, with upper panel 115 and lower panel 125 in an extended position approximately ninety degrees relative to body 110. Image subject 140 is disposed upon lower panel 125. Upper panel 115 includes an image capture module 155, such as a CCD or CMOS camera module. However, any type of image capture module 155 suitable for capturing an image of an image subject 140 may be utilized in accordance with the features of device 100, as described herein. Image capture module 155 is connected to processing circuitry 200, such as that described in connection with FIG. 7, by suitable means such as a thin, flexible circuit connector. Image capture module 155 may be activated when upper panel 115 is partially or wholly rotated relative to body 110, and may be deactivated when upper panel 115 is partially or wholly returned to its original, stowed position.

Image capture module 155 may have a pre-determined focal depth when upper panel 115 is in a pivoted or deployed position of approximately ninety degrees relative to body 110 so that the features of image subject 140 remain inside the depth of field 162. Image capture module 155 may further have a pre-determined field of view 160 when upper panel 115 is pivoted approximately ninety degrees relative to body 110 so that a typically sized business or name card remains inside the field of view 160 of image capture module 155.

Upper panel 115 may be further rotated on hinge 170 to a position approximately one hundred eighty degrees relative to body 110, so that device 100 can be used as a digital camera. As shown in FIG. 4, upper panel 115 may be rotated approximately 180 degrees to a position where the device 100 may operate as a digital camera. Consequently, the upper panel 115, with accompanying image capture module 155 may be partially deployed, or rotated from its stowed position, approximately 90 degrees to a partially deployed position where the device 100 may operate as a card reader. When the upper panel 115 is fully deployed, e.g., rotated approximately 180 degrees, or to a position between approximately 90 degrees and 180 degrees, the device 100 may operate as a camera. Where the application suggests a modification of the image processing in response to the particular application, a position sensor 172 may be included to sense the position of upper panel 115, and adjust the processing accordingly. Thus, for example, where the device is operated in a card reader mode, with the upper panel 115 deployed approximately 90 degrees from its stowed position, the processor may operate to adjust imaging for a focal length and field of view appropriate to image a card, or other image subject disposed on lower panel 125. However, where the position sensor detects that the upper panel 115 has been rotated to a position 180 degrees from the stowed position or some alternate position between 90 and 180 degrees from the stowed position, the processing may be operative to image a wider field of view or focal length.

Referring to FIGS. 3, 4 and 5, exemplary position sensor 172 is shown, which is operative to generate a signal in response to relative position, or orientation, of upper panel 115 about hinge 170. The position sensor 172 may be implemented in various forms and operative to generate a signal representative of the rotation of upper panel 115 relative to body 110. In one embodiment the position sensor 172 is operative to generate signals, indicating that upper panel 115 has reached a predetermined relative position of upper panel 115, e.g., stowed position; deployed 90 degrees relative to body 110; or deployed 180 degrees relative to body 110. The hinge 170 may be constructed to releasably lock the upper panel 115 in place as it reaches each of those discrete positions. In another embodiment, the position sensor 172 is operative to generate a continuously variable signal representative of the relative deployment of the upper panel 115 in relation to body 110, or some other fixed reference point.

FIG. 4 is a representation of a front view of device 100 showing upper panel 115 pivoted approximately one hundred eighty degrees, i.e., fully deployed. The focal depth and field of view are not fixed and may be accordingly adjusted when upper panel 115 is extended to this position. Image capture module 155 may have a zoom capability that can be controlled using a menu button (not shown), as further described with respect to FIG. 6.

In one alternate embodiment, shown at FIG. 5, upper panel 115 may be vertically translated to a camera mode position without the need for rotation. Use of the device shown in FIG. 5, in a card reader mode, may be affected by pivoting the upper panel 115 about hinge 170, after it is extended to its upward position.

As will be apparent to those of ordinary skill in the art, device 100, may be implemented in a variety of different constructions. The particular mechanism for deploying upper panel 115, the sensing mechanism that may be used for monitoring the motion of upper panel 115, and processing functions that may be implemented in response to the position of upper panel 115, and therefore the intended mode of operation, may each be selected and modified in accordance with alternate techniques and preferences without departing from the broader aspects of the present invention.

FIG. 6 is a representation of a back view of an alternative embodiment of device 100 similar to a traditional digital camera. Back surface 112 of body 110 may include a display screen 180, such as an LCD screen. Display screen 180 displays an image of the subject during the image capture process to enable the user to make any adjustments, if necessary. Display screen 180 further displays the captured image for user review so the user may repeat the process, if desired. Power supply input 205 may be provided to accommodate an AC power supply. Menu button 185 may be provided to manage and control the features of the device or its programming in connection with a control unit 190. Image finder 200 may be provided to enable the user to view the image subject. The user may toggle the image between image finder 200 and display screen 180. Mode selector 195 may be provided for the selection of the mode of device 100, such as the use of device 100 as a business card reader or as a digital camera. Power button 220 may be included if device 100 is not automatically activated when upper panel 115 is rotatably displaced from body. Device 100 may be further adapted to include a memory slot (not shown) to accommodate a removable memory storage module and a data transfer device input (not shown) to facilitate the transfer of the captured images to an external device. These features may be located anywhere on the device and are further described with respect to FIG. 7.

Figure 7:
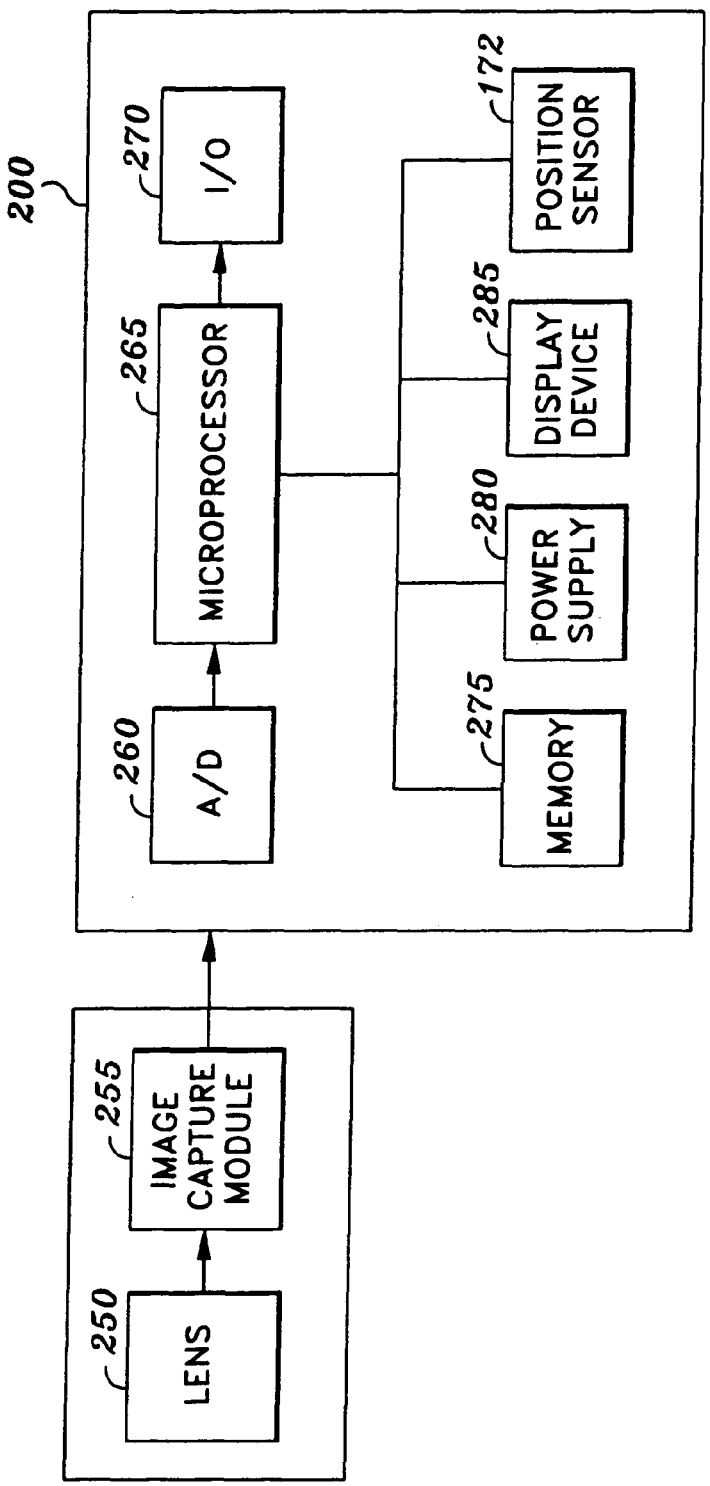
FIG. 7 is a block diagram of an exemplary system that may be used to operate an image capture device according to the present invention.

FIG. 7 is a block diagram showing an exemplary configuration of a system used to operate device 100. Device 100 may have a circuit configuration similar to a digital still camera. As indicated above, device includes a lens 250 which focuses light on image capture module 255 to create an image of the image subject. Image capture module 255 is preferably a CCD camera module. Image capture module 255 may also be a CIS camera module, a complementary metal oxide semiconductor (CMOS) camera module or any other image capture module. Image capture module 255 is in communication with an analog-to-digital, or A/D, converter 260. A/D converter 260 receives the electrical charges that are output by the image capture module 255 and converts the charges into a digital signal representative of the image. The A/D 260 converter is in communication with a microprocessor 265 which controls the operation of device 100, including built-in software and other firmware. Memory 275 may be built-in memory or a removable flash memory module which is detachably connected to processor. Processor 265 may be further connected to a display device 285 on back surface of body, such as the LED display screen described with respect to FIG. 6, to display image output to the user. In addition, output from other components of device are supplied to processor 265 including power button 220, menu button 185 and control unit button 190, if present. Processor 265 is connected to power supply 280 which can be an AC power source. Power supply 280 may also be a rechargeable lithium-ion battery.

The data and information of captured images can be uploaded or transferred from device 100 in connection with an input/output device 270 or other connection. In one embodiment, the images and other data collected from device 100 are uploaded by transferring the data to a personal computer by means of a physical connection such as an RS232 or a USB port. The physical connection may also be accomplished by using a cradle, similar to a personal digital assistant (not shown) which may be electronically coupled to a personal computer and into which device 100 may be inserted. The information transfer can be initiated through a control on the cradle or automatically when device is inserted into cradle. Data may also be transferred to a computer by device 100 by means of a short-range wireless transmission, such as Bluetooth.

The above description is given by way of example, and not limitation. Given the above disclosure, one skilled in the art could devise variations that are within the scope and spirit of the invention disclosed herein Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable image capture and camera device comprising:
a body;
an upper panel rotatably engaged to the body and having an image capture module disposed on a first surface thereof, wherein the image capture module is operative with both a first set of predetermined focal depth and field of view values and a second set of predetermined focal depth and field of view values;
a lower panel rotatably engaged to the body, for receiving and supporting a first object when the lower panel is deployed to an open position, wherein the lower panel includes first and second edges that are raised relative to the lower panel to create a recessed groove that guides and supports the insertion and positioning of the first object;
wherein the upper panel is rotatable to deploy from a stowed position to a first deployed position to image the first object disposed on the lower panel, and to a second deployed position to image a second object disposed remote from the device;
a position sensor disposed on the body proximate the upper panel, wherein the position sensor is operative to continuously generate an output signal representative of the orientation of the upper panel relative to the body, wherein when the upper panel is pivoted approximately 180 degrees from the body, the image capture module utilizes the first set of predetermined focal depth and field of view values to capture an object as a digital camera, wherein when the upper panel is pivoted approximately 90 degrees from the body, the image capture module utilizes the second set of predetermined focal depth and field of view values to capture a business card like object as a card reader; and
a microprocessor, wherein the microprocessor is operative to regulate processing of information received from the image capture module in response to the output signal and relative to the orientation of the upper panel.

2. The device as recited in claim 1 wherein the first deployed position is a position displaced approximately 90 degrees from the stowed position.

3. The device as recited in claim 2 wherein the second deployed position is a position displaced approximately 180 degrees from the stowed position.

4. The device as recited in claim 3 wherein the image capture module is in any of a substantially abutting relation and a spaded relation to the body when the upper panel is disposed in the stowed position.

5. The device as recited in claim 1 further comprising processing circuitry for receiving information from the image capture module and generating an output display thereof.

6. The device as recited in claim 5 wherein the processing circuitry includes a display device and the microprocessor, wherein the microprocessor is in electrical communication with the display device, the image capture module and the position sensor.

7. The device as recited in claim 6 wherein the microprocessor is programmed to include optical character recognition software.

8. The device as recited in claim 7 wherein the microprocessor regulates operation of the optical character recognition software in response to a signal from the position sensor, indicating the position of the upper panel.

9. The device as recited in claim 1, wherein the image capture module utilizes a value that is a predetermined value when the upper panel is in the first deployed position and is an adjustable value when the upper panel is in the second deployed position.

10. The device as recited in claim 9, wherein the value is an adjustable value when the upper panel is in the first deployed position and is a predetermined value when the upper panel is in the second deployed position.

11. The device as recited in claim 9 wherein the value is any of a focal depth value and a field of view value.

* * * * *